United States Patent [19]
Kasari et al.

[11] Patent Number: 5,326,596
[45] Date of Patent: Jul. 5, 1994

[54] COATING METHOD

[75] Inventors: Akira Kasari, Hiratsuka; Hiroaki Oda, Hiratsuka; Mitsuru Muramoto; Yasumasa Okumura, both of Kanuma; Yasuji Tanaka, Aichi, all of Japan

[73] Assignee: Kansai Paint Company, Ltd., Amagasaki, Japan

[21] Appl. No.: 983,707

[22] Filed: Dec. 1, 1992

[30] Foreign Application Priority Data

Dec. 19, 1991 [JP] Japan .................................. 3-355076

[51] Int. Cl.$^5$ ................................................ B05D 3/02
[52] U.S. Cl. .................................. 427/379; 204/181.1; 427/409; 427/410
[58] Field of Search .................... 204/181.1, 181.3; 427/407.1, 409, 410, 412.6, 379

[56] References Cited

U.S. PATENT DOCUMENTS 4,755,418 7/1988 DebRoy et al. ................. 427/410 X
4,761,212 8/1988 Watanabe et al. ............... 204/181.1

FOREIGN PATENT DOCUMENTS 0407968 1/1991 European Pat. Off. .
3915622 11/1989 Fed. Rep. of Germany .
9112899 9/1991 PCT Int'l Appl. .

Primary Examiner—Michael Lusignan
Attorney, Agent, or Firm—Armstrong, Westerman, Hattori, McLeland & Naughton

[57] ABSTRACT

The present invention provides a method for forming a coating film, comprising the steps of:
(a) coating a metal panel with a cationic electrophoretic coating composition and heating the composition to form an electrophoretic coating,
(b) applying to the electrophoretic coating an aqueous primer containing a polyurethane emulsion prepared by subjecting a carboxyl-containing urethane prepolymer to chain extension by water,
(c) applying an intermediate coating composition to the primer surface,
(d) baking the aqueous primer and the intermediate coating composition at the same time, and
(e) applying a top coating composition to the cured coating and baking the composition.

2 Claims, No Drawings

COATING METHOD

The present invention relates to a method for forming a coating film having an improved chipping resistance, the coating film being composed of a cationic electrophoretic coating, an intermediate coating and a top coating formed on a metal panel, such as automotive body panels.

Recently in the field of the automotive industry, there has come to be taken up more seriously the durability of the coating film on automotive outer bodies, particularly, the deterioration of corrosion resistance of the coating film and the progress of corrosion of the steel or like material both caused by the impact cracking of the coating film. For example, in the cold climatic areas of Europe and America, in order to prevent the surface freezing of roads for automobiles, there are often laid on the roads in winter pebbles mixed with a large quantity of rock salt ground to relatively coarse particles. In automobiles running on such roads, the coating film on their body panels is hit by the rock salt particles and pebbles flipped by the wheels and o this impact often causes an impact cracking phenomenon, namely, so-called "chipping" in which the coating film locally peels off the body completely, or the top coating film locally peel off the electrophoretic coating film. Owing to this phenomenon, the metal surface of the outer body beneath the hit areas of the coating film is exposed to an atmosphere leading to rapid formation of rust and progress of corrosion. Furthermore, the cracking pronouncedly damages the appearance of the coating surface. The cracking of coating film due to chipping usually appears more in the bottom and underbody, but it appears even in the hood or the roof. It is known that the resulting local corrosion progresses to a considerable degree in about 6 months to one year.

To prevent the progress of corrosion of the steel or like substrate due to chipping, we have already proposed a coating method wherein a barrier coating composition consisting essentially of a modified polyolefin resin is applied between the electrophoretic coating film and the intermediate coating film (Japanese Unexamined Patent Publication No. 120673/1986.)

However, since said modified polyolefin resin has such a high molecular weight as to protect a coated article deformed by external force against cracking, peeling and like defects, a large amount of organic solvent is required in order to dilute the resin to a viscosity suitable for coating. Thus, the resin has problems from the viewpoints of safety and hygiene for the operator during coating operation, prevention of environmental pollution due to coating and safety from fire, explosion, etc. in coating and baking.

The proposed coating method has a further disadvantage. That is to say, an intermediate coating is imparted a deteriorated finishing appearance by simultaneous application of a barrier coating composition and an intermediate coating composition, followed by concurrent baking of the two compositions. Thus the intermediate coating composition needs to be applied after baking the barrier coating composition.

An object of the present invention is to provide a novel method for forming a coating film which is excellent in chipping resistance and free of the above-mentioned problems of the prior art.

This and other objects of the present invention will become apparent from the following description.

The present invention provides a method for forming a coating film, comprising the steps of:

(a) coating a metal panel with a cationic electrophoretic coating composition and heating the composition to form an electrophoretic coating, (b) applying to the electrophoretic coating an aqueous primer containing a polyurethane emulsion prepared by subjecting a carboxyl-containing urethane prepolymer to chain extension by water, (c) applying an intermediate coating composition to the primer surface, (d) baking the aqueous primer and the intermediate coating composition at the same time, and (e) applying a top coating composition to the cured coating and baking the composition.

We have conducted extensive research to improve the chipping resistance and other properties of the coating film formed on a metal panel. Consequently we have found that when an aqueous primer containing a polyurethane emulsion prepared by subjecting a carboxyl-containing urethane prepolymer to chain extension by water is applied between the cationic electrophoretic coating and the intermediate coating, a coating film with excellent chipping resistance can be obtained, and the above primer and an intermediate coating composition can be baked at the same time. The present invention has been accomplished based on this novel finding.

The coating method of the present invention will be described below in more detail.

The substrate to be coated by the method of the present invention is a metal panel. Useful metal panels are not limited specifically insofar as the panels have a metallic surface which can be coated with a cationic electrophoretic coating composition. Examples of useful metal panels are those of iron, copper, aluminum, tin, zinc and alloys containing such metals; those plated with such metals or alloys; those coated with such metals or alloys by vapor deposition; etc. More specific examples of substrates are automotive body panels of such metals, including those of motor vehicles, trucks, motorcycles, etc. These metal panels are preferably subjected to chemical conversion treatment using phosphate, chromate, etc. before application of the cationic electrophoretic coating composition.

The cationic electrophoretic coating composition is used for coating the above-mentioned metal panels and can be of the type already known per se. The cationic electrophoretic coating composition is an aqueous one containing a basic water-dispersible resin to be neutralized with an organic or inorganic acid, for example, an epoxy resin, acrylic resin, polybutadiene resin or like resin having numerous amino groups in the resin skeleton. The cationic electrophoretic coating composition can be prepared in a conventional manner by admixing the resin with a neutralizing agent, a pigment (such as coloring pigment, extender pigment, rust-preventive pigment or the like), a hydrophilic solvent, water, and, when required, a curing agent, a crosslinking agent, additives and the Nike. The neutralizing agents to be used for neutralizing and dissolving or dispersing the basic water-dispersible resin in water include, for example, acetic acid, hydroxylacetic acid, propionic acid, butyric acid, lactic acid, glycine and like organic acids, and sulfuric acid, hydrochloric acid, phosphoric acid and like inorganic acids. A suitable amount of the neutralizing agent is a neutralization equivalent of about 0.1 to about 0.4 relative to the value of the base of the resin (about 30 to about 200). The obtained composition is diluted with deionized water to a solids concentration of about 5 to about 40 wt. %, maintained at a pH of 5.5 to 8.0 and electrophoretically applied to the metal panel by a conventional method. The thickness of the electrophoretic coating is not limited specifically, but preferably about 10 to about 40 μm when cured. The composition is cured by heating at about 140° to about 210° C.

The aqueous primer is to be applied to the cationic electrophoretic coating and contains a polyurethane emulsion obtained by subjecting a carboxyl-containing urethane prepolymer to chain extension by water.

Preferable as the aqueous primer is a self-emulsifiable urethane emulsion prepared by subjecting a urethane prepolymer to chain extension by water and to emulsification after or during neutralization of the urethane prepolymer with a tertiary amine, the urethane prepolymer consisting essentially of (i) at least one of an aliphatic diisocyanate and an alicyclic diisocyanate, (ii) at least one of a polyether diol and a polyester diol both having a number-average molecular weight of about 500 to about 5000, (iii) a low-molecular weight polyhydroxyl compound and (iv) a dimethylolalkanoic acid in an NCO/OH equivalent ratio of 1.1-1.9/1.

Stated more specifically, the urethane emulsion is an aqueous dispersion of self-emulsifiable urethane resin of about 0,001 to about 1.0 μm in mean particle size prepared by the following method. First a urethane prepolymer is synthesized by subjecting to a one-shot or multi-stage polymerization in the presence or absence of a hydrophilic organic solvent free of active hydrogen group in the molecule: (i) an aliphatic and/or alicyclic diisocyanate, (ii) a polyether diol or polyester diol both having a number-average molecular weight of about 500 to about 5000 or a mixture thereof, (iii) a low-molecular weight polyhydroxyl compound and (iv) a dimethylolalkanoic acid in an NCO/OH equivalent ratio of 1.1-1.9/1. The prepolymer thus obtained is mixed with water after or during neutralization of prepolymer with a tertiary amine, and the resulting mixture is subjected to reaction for chain extension by water while being emulsified and dispersed in water. Thereafter, when required, the organic solvent is distilled off.

Examples of the component (i) for use in the preparation of the urethane prepolymer, i.e., aliphatic or alicyclic diisocyanate, include aliphatic diisocyanates having 2 to 12 carbon atoms such as hexamethylene diisocyanate, 2,2,4-trimethylhexane diisocyanate and lysine diisocyanate; alicyclic diisocyanates having 4 to 18 carbon atoms such as 1,4-cyclohexane diisocyanate, 1-isocyanato-3-isocyanatomethyl-3,3,5-trimethylcyclohexane (isophorone diisocyanate), 4,4'-dicyclohexylmethane diisocyanate, methylcyclohexylene diisocyanate and isopropylidene dicyclohexyl-4,4'-diisocyanate; modified products of these diisocyanates (such as those containing carbodiimide, uretdione, uretone imine or the like); and mixtures of at least two of them; etc. Among them, preferred are alicyclic diisocyanates, especially 1,4-cyclohexane diisocyanate, 1-isocyanato-3-isocyanatomethyl-3,5,5-trimethylcyclohexane and 4,4'-dicyclohexylmethane diisocyanate.

Use of aromatic diisocyanate as the component (i) tends to yellow the coating during baking for curing and to cause the discoloration of coating on exposure to ultraviolet light. Hence it is undesirable.

Examples of the component (ii) for use in the preparation of the urethane prepolymer, i.e., polyether diols and polyester diols both having a number-average molecular weight of about 500 to about 5000, preferably about 1000 to about 3000, include those prepared by polymerizing or copolymerizing (block or random) alkylene oxide (such as ethylene oxide, propylene oxide, butylene oxide or the like) and/or a heterocyclic ether (such as tetrahydrofuran or the like). Examples of resulting polymers are polyethylene glycol, polypropylene glycol, polyethylene-propylene (block or random) glycol, polytetramethylene ether glycol, polyhexamethylene ether glycol and polyoctamethylene ether glycol; condensation polymers of dicarboxylic acid (such as adipic acid, succinic acid, sebatic acid, glutaric acid, maleic acid, fumaric acid, phthalic acid or the like) with glycol (such as ethylene glycol, propylene glycol, 1,4-butanediol, 1,6-hexanediol, 3-methyl-1,5-pentanediol, neopentyl glycol, bishydroxymethylcyclohexane and the like). Examples of the condensation polymers are polyethylene adipate, polybutylene adipate, polyhexamethylene adipate, polyneopentyl adipate, poly-3-methylpentyl adipate, polyethylene/butylene adipate and polyneopentyl/hexyl adipate; polylactone diols such as polycaprolactone diol and poly-3-methylvalerolactone diol; polycarbonate diols; mixtures of at least two of them; etc.

Examples or the component (iii) for use in the preparation of the urethane prepolymer, i.e., low-molecular weight polyhydroxyl compounds, include those of about 500 or less in number-average molecular weight, e.g. glycols as exemplified above as the material for the polyester diol and low-molecular weight addition products (molecular weight of about 500 or less) of the glycol with alkylene oxide; trihydric alcohols such as glycerin, trimethylol ethane, trimethylol propane and the like and low-molecular weight addition products (molecular weight of about 500 or less) of the alcohol with alkylene oxide; mixture of at least two of them; etc. The low-molecular weight polyhydroxyl compound is used in an amount of about 0.1 to about 20 wt. %, preferably about 0.5 to about 10 wt. %, based on the polyether diol or polyester diol.

Examples of the component (iv) for use in the preparation of the urethane prepolymer, i.e., dimethylolalkanoic acid, include dimethylolacetic acid, dimethylolpropionic acid, dimethylolbutyric acid, etc. among which dimethylolpropionic acid is preferred. The dimethylolalkanoic acid is used in an amount of about 0.5 to about 5 wt. %, preferably about 1 to about 3 wt. (calculated as the carboxyl group (—COOH)), based on the urethane prepolymer prepared by reacting the components (i) to (iv). If the amount of carboxyl group is less than 0.5 wt. %, it is difficult to prepare a stable emulsion. However, if the amount exceeds 5 wt. %, the degree of hydrophilic property is increased, rendering the emulsion highly viscous and decreasing the water resistance of coating. The carboxyl group can improve the adhesion of the resulting primer to the cationic electrophoretic coating and to the intermediate coating.

Examples of tertiary amines useful for neutralization of dimethylolalkanoic acid are trialkylamines such as trimethylamine, triethylamine, triisopropylamine, tri-n-propylamine, and tri-n-butylamine; N-alkylmorpholines such as N-methylmorpholine and N-ethylmorpholine; N-dialkylalkanolamines such as N-dimethylethanolamine and N-diethylethanolamine; mixtures of at least two of them; etc. Among them, preferable is trialkylamine and more preferable is triethylamine. The neutralization degree of tertiary amine is about 0.5 to about 1 equivalent, preferably about 0.7 to about 1 equivalent, per equivalent of carboxyl group of dimethylolalkanoic acid.

The aqueous primer may contain an organic solvent, extender pigment, coloring pigment, ultraviolet-absorber, antioxidant, surfactant etc.

According to the present invention, the method of applying the aqueous primer is not limited specifically, and includes, for example, spray coating, brush coating and dip coating. The coating is preferably about 1 to about 20 μm, more preferably about 5 to about 15 μm in thickness when baked.

After applying the aqueous primer, the primer is dried in air usually at about 20 to about 100° C, preferably about 40° to about 60° C., for about 1 to about 10 minutes, preferably about 2 to about 5 minutes. Thereafter, the resulting coating is coated with the intermediate coating composition described below.

The intermediate coating composition is to be applied to the aqueous primer surface, and can be of the type known per se insofar as it can form a coating which is excellent in adhesion, smoothness, distinctness-of-image gloss, overbaking resistance, weather resistance and the like. Stated more specifically, usable intermediate coating compositions include an organic solvent-type thermoserring intermediate coating composition containing as essential vehicle components an amino resin and a short- or ultrashort-oil alkyd resin having oil length of up to 30 wt. % or an oil-free polyester resin. The alkyd resin and polyester resin are preferably about 60 to about 140 in hydroxyl value, about 5 to about 20 in acid value and those modified with an unsaturated oil (or unsaturated aliphatic acid). Preferred examples of the amino resin are melamine resin, urea resin, benzoguanamine resin and like resins alkyletherified with $C_1$ to $C_5$ alkyl. Suitable proportions of these resins are about 65 to about 85 wt. %, especially about 70 to about 80 wt. %, of alkyd resin and/or oil-free polyester resin and about 35 to about 15 wt. %, especially about 30 to about 20 wt. % of amino resin based on the combined amount of the resins (calculated as solids). Further, a polyisocyanate compound or blocked polyisocyanate compound can be used in place of the amino resin. While the most preferred intermediate coating composition is of an organic solvent type, useful intermediate coating compositions are of non-aqueous dispersion type, high solids type, water-soluble type, water-dispersible type, etc. each containing said vehicle component. According to the present invention, the intermediate coating composition has a hardness (pencil hardness) preferably in the range of 3B to 2H. When required, the intermediate coating composition may further contain an extender pigment, coloring pigment and other additives for coating compositions.

According to the present invention, the intermediate coating composition can be applied to the aqueous primer coating in the same manner as done in the application of the aqueous primer coating composition. The coating has a thickness preferably in the range of about 10 to about 50 μm when baked. The baking temperature is usually about 80° to about 170° C., preferably about 120° to about 150° C., although variable according to the vehicle components.

The top coating composition is to be applied to the intermediate coating to give a beautiful appearance to the coated article. Stated more specifically, useful top coating compositions include those known per se which can form a coating with excellent finishing appearance (such as distinctness-of-image gloss, smoothness, gloss, etc.), weather resistance (such as gloss retention, color retention, chalking resistance, etc.), chemical resistance, water resistance, humidity resistance, curability and the like. For example, a top coating composition is useful which is a liquid or powder coating composition prepared by dissolving or dispersing an amino-acrylic resin mixture, amino-alkyd resin mixture, amino-polyester resin mixture or the like as the essential vehicle component in water or an organic solvent. The form of the liquid coating composition is not limited specifically but can be an organic solution type, non-aqueous dispersion type, water-soluble type (or water-dispersible type), high solid type, etc. The coating can be formed, for example, by drying the top coating composition at an ambient temperature or an elevated temperature or irradiating the composition with active energy rays such as electron rays and ultraviolet rays. According to the present invention, the obtained top coating has a pencil hardness preferably in the range of 2B to 3H (as determined by the scratch method at 20° C.).

The top coating compositions for use in the present invention are classified into an enamel coating composition and a clear coating composition both containing the above-mentioned vehicle component but different from each other in that the former contains a metallic pigment and/or a coloring pigment and the latter is completely or substantially free of such pigment. Using these coating compositions, the top coating is formed, for example, by the following methods.

(1) Applying a metallic coating composition containing a metallic pigment, and when required, a coloring pigment, or a solid-color coating composition containing a coloring pigment, and curing the coating composition by heating (metallic or solid-color finish by a one-coat one-bake method).

(2) Applying a metallic or solid-color composition, curing the coating composition by heating, applying a clear coating composition to the metallic or solid-color coating and further curing the coating composition by heating (metallic or solid-color finish by two-coat two-bake method).

(3) Applying a metallic or solid-color coating composition, applying a clear coating composition onto the metallic or solid-color coating composition and curing the two coating compositions by heating at the same time (metallic or solid-color finish by two-coat one-bake method).

The top coating composition is applied preferably by spray coating, electrostatic coating, etc. In the case of the method (1), the coating is preferably about 25 to about 40 μm in thickness when baked. In the case of the methods (2) and (3), the metallic and solid-color coatings are about 10 to about 30 μm, and the clear coating is about 25 to about 50 μm in thickness when baked. The top coating composition is heated at about 80° to about 170° C., preferably about 120° to about 150° C., for about 10 to about 40 minutes, although the heating conditions can be suitably selected according to the vehicle components.

According to the coating method of the present invention, the resulting multi-layer coating film is given an excellent chipping resistance particularly due to the application of a specific aqueous primer coating between the cationic electrophoretic coating and the intermediate coating. Presumably, it is because the primer coating is formed of a high-molecular weight material having an urethane bond or the like, and thus can absorb the energy of external force as by stone so that the obtained coating film is imparted an enhanced chipping resistance.

The aqueous primer for use in the present invention has the following advantages:
(1) being free of problems from the viewpoints of prevention of environmental pollution and safety,
(2) forming a coating with a beautiful appearance when the primer and intermediate coating compositions are baked at the same time,
(3) having an excellent adhesion to the cationic electrophoretic coating, and
(4) having an excellent adhesion to the intermediate coating.

Examples and Comparative Examples are given below to clarify the present invention in more detail.
Metal panel:

A zinc-plated steel panel treated with "Palbond No. 3030" (trademark for a zinc phosphate type primer manufactured by Nihon Parkerizing Co., Ltd.) was used as a metal panel to be coated. Cationic electrophoretic coating composition:

"Elecron No. 9200" (trademark for an epoxy polyamide cationic electrophoretic coating composition manufactured by Kansai Paint Co., Ltd.) was used. Aqueous primer:

An NCO-terminated prepolymer having an NCO content of 4.0% was obtained by reacting 230 g of polybutylene adipate (2000 in number-average molecular weight), 230 g of polycaprolactone diol (2000 in number-average molecular weight), 46 g of dimethylolpropionic acid, 13 g of 1,4-butanediol and 240 g of isophorone diisocyanate. Subsequently, 330 g or acetone was added to the obtained prepolymer to homogeneously dissolve the prepolymer therein. Then 31 g of triethylamine was added with stirring, and further 1200 g of ion exchange water was added. The obtained aqueous dispersion was held at 50° C. for 2 hours to complete the reaction for chain extension by water. The acetone was distilled off under reduced pressure, giving a polyurethane emulsion containing 42% solids. The obtained polyurethane emulsion was used as a primer. Intermediate coating composition:

"Amilac N-2 Sealer" (trademark for an aminopolyester resin-type intermediate coating composition manufactured by Kansai Paint Co., Ltd.) was used. Top coating compositions:

The following top coating compositions were used.
Top coating composition (1): "Amilac White" (trademark for an aminoalkyd resin-type top coating composition manufactured by Kansai Paint Co., Ltd.) Top coating composition (2): "Magicron Silver" (trademark for an aminoacrylic resin-type top coating composition manufactured by Kansai Paint Co., Ltd., silver metallic coating composition for a two-coat one-bake method) Top coating composition (3): "Magicron Clear" (trademark for an aminoacrylic resin-type clear coating composition for a two-coat one-bake method manufactured by Kansai Paint Co., Ltd.)

EXAMPLE 1

The cationic electrophoretic coating composition was electrophoretically applied to the steel panel to form an electrophoretic coating having a thickness of 20 μm (when cured). The coated panel was washed with water and cured with heating at 170° C. for 30 minutes.

Subsequently, the aqueous primer diluted with water to a viscosity of Ford cup No. 4 (25° C., 20 sec.) was applied to the coated panel by spraying to a thickness of 10 μm (when baked), and was dried in air at room temperature for 3 minutes. Then the intermediate coating composition was applied to a thickness of 30 μm (when baked), and was baked together with the aqueous primer at 140° C. for 30 minutes to form a primer coating and intermediate coating.

The top coating composition (1) was applied by spraying to the surface of the intermediate coating to a thickness of 40 μm (when baked), and baked at 140° C. for 30 minutes to give a multi-layer coating film (white) of Example 1.

EXAMPLE 2

The top coating composition (2) was applied by spraying to the intermediate coating obtained in the same manner as in Example 1 to a thickness of 15 μm (when baked). Subsequently, the top coating composition (3) was applied by spraying to a thickness of 35 μm (when baked), and the coating composition (2) and (3) were baked at 140° C. for 30 minutes to obtain a multi-layer coating film (silver) of Example 2.

Comparative Example 1

A multi-layer coating film (white) was obtained in the same manner as in Example 1 except that the aqueous primer was not used.

Comparative Example 2

A multi-layer coating film (white) was obtained in the same manner as in Example 1 except that a styrene-butadiene latex (product of Nippon Zeon Co., Ltd.) was used in lieu of the aqueous primer.

The coating films obtained in the Examples and Comparative Examples were tested for performance. The results are shown in Table 1 below.

TABLE 1

| Properties | Example 1 | Example 2 | Com. Ex. 1 | Com. Ex. 2 |
|---|---|---|---|---|
| Gloss (60°) | 95 | 95 | 95 | 88 |
| Distinctness-of-image gloss *1 | 84 | 81 | 84 | 68 |
| Chipping resistance *2 | | | | |
| Film surface condition | A | A | D | B |
| Salt water spray resistance | A | A | D | C |
| Impact resistance *3 | 50< | 50< | 30 | 50< |
| Humidity resistance *4 | | | | |
| Appearance | A | A | A | B |
| Adhesion | 10 | 10 | 8 | 4 |

*1 Distinctness-of-image gloss

*1 Distinctness-of-image gloss
*2 Chipping resistance
*3 Impact resistance
4 Humidity resistance The test methods are as follows.

Measured by an image clarity meter (product of Suga Shikenki Co., Ltd.). The FIGURES in the table are ICM values in the range of 0 to 100%. The greater the value, the better the distinctness-of-image gloss (image clarity). ICM values of not lower than 80 represent excellent distinctness-of-image gloss.

The test was conducted using the following machine and under the following conditions.
(1) Gravel impact testing machine: Q-G-R Gravelometer (product of Q Panel Co.).
(2) Stones to be blown: Crushed stones having diameters of about 15 to 20 mm.
(3) Volume of stones to be blown: About 50 ml.

(4) Blowing air pressure: About 2 kg/cm$^2$.
(5) Test temperature: About 20° C.
(6) Blowing angle to the film surface: 45°.

A test panel was fixed to a support panel. Crushed stones were allowed to hit the test panel under the above blowing conditions. Thereafter the test panel was observed to evaluate the film surface condition and salt water spray resistance. The film surface condition was evaluated by visual inspection according to the criteria given below. In the test for salt water spray resistance, the test panel hit by the crushed stones was subjected to a salt water spray test by JIS Z 2371 for 960 hrs. Then, an adhesive cellophane tape was stuck to the film surface of the test panel and quickly peeled off. The impacted portion of the coating film was observed to check the state of subsequent rust development, condition of corrosion, peeling of coating film, etc.

Evaluation Criteria (1) Film Surface Condition

A: Cracking by hitting is recognizable very slightly at the limited area of the top coating. There is no peeling of electrophoretic coating film.

B: Cracking by hitting was recognizable in some areas of the top coating, and peeling of the electrophoretic coating was seen at a less number of areas.

C: The top coating peeled off at numerous areas and the electrophoretic coating peeled off in a minor degree.

D: The greatest part of the top coating film peeled off. The electrophoretic coating film peeled off at the impacted portions and their surrounding areas.

(2) Salt Water Spray Resistance

A: Rust development, corrosion, film peeling, etc. were not found.

B: A slight degree of rust, corrosion and film peeling was found.

C: A fair degree of rust, corrosion and film peeling was found.

D: A conspicuous degree of rust, corrosion and film peeling was found.

A 500-gram weight was dropped onto the film surface of test panel using a Du Pont impact tester (impact rod of ½ inch in radius) to determine a maximum distance of fall (cm) at which the coating remained free of cracking.

The test panel was allowed to stand for 72 hours in an atmosphere at a temperature of 50° C. and a relative humidity of 95%. Thereafter the film appearance was visually inspected and the degree of adhesion was determined by a cross cut test using an adhesive tape. The film appearance was evaluated according to the following criteria.

A: No abnormality.

B: A slight degree of blistering, peeling or other abnormalities was recognized.

C: A marked degree of blistering, peeling or other abnormalities was recognized.

The cross cut test was conducted according to JIS K-5400 8.5.2.

We claim:

1. A method for forming a coating film, comprising the steps of:
   (a) coating a metal panel with a cationic electrophoretic coating composition and heating the composition to form an electrophoretic coating,
   (b) applying to the electrophoretic coating an aqueous primer containing a polyurethane emulsion prepared by subjecting a carboxyl-containing urethane prepolymer to chain extension by water,
   (c) applying an intermediate coating composition to the primer surface,
   (d) baking the aqueous primer and the intermediate coating composition at the same time, and
   (e) applying a top coating composition to the cured coating and baking the composition.

2. A method according to claim 1 wherein the aqueous primer is a self-emulsifiable urethane emulsion prepared by subjecting a urethane prepolymer to chain extension by water and to emulsification after or during neutralization of the urethane prepolymer with a tertiary amine, the urethane prepolymer consisting essentially of (i) at least one of an aliphatic diisocyanate and an alicyclic diisocyanate, (ii) at least one of a polyether diol and a polyester diol both having a number-average molecular weight of about 500 to about 5000, (iii) a low-molecular weight polyhydroxyl compound and (iv) a dimethylolalkanoic acid in an NCO/OH equivalent ratio of 1.1–1.9/1.

* * * * *